United States Patent [19]

Hallman

[11] Patent Number: 5,146,472
[45] Date of Patent: Sep. 8, 1992

[54] METHOD FOR IMBEDDING INFORMATION IN MODEM HANDSHAKE PROCEDURE AND MODEMS INCORPORATING THE SAME

[75] Inventor: Edward H. Hallman, Brookfield, Conn.

[73] Assignee: General DataComm, Inc., Middlebury, Conn.

[21] Appl. No.: 502,161

[22] Filed: Mar. 28, 1990

[51] Int. Cl.$^5$ .............................................. H04L 29/08
[52] U.S. Cl. ..................................... 375/8; 340/825.31; 375/13; 375/121; 380/23
[58] Field of Search ........................... 380/3, 4, 23, 48; 340/825.31, 825.34; 370/110.1; 375/8, 121, 13; 379/62

[56] References Cited

U.S. PATENT DOCUMENTS

| 4,811,377 | 3/1989 | Krolopp et al. ............... 340/825.34 |
| 4,812,994 | 3/1989 | Taylor et al. ................. 340/825.31 |
| 4,868,864 | 9/1989 | Tjahjadi et al. ..................... 375/121 |
| 4,964,163 | 10/1990 | Berry ..................................... 380/23 |
| 4,995,083 | 2/1991 | Baker et al. ........................... 380/23 |

OTHER PUBLICATIONS

"Multi-Tech Enhances Modems with Security, Remote Support", PC Week/Connectivity/Wide Area Systems; Jul. 17, 1989.
"Microcom Eyes Broader Base with Low-Cost V.32 Modem"; Tara Sexton; PC Week; Jul. 5, 1989.
Data Communication over the Telephone Network, CCITT Red Book, vol. VIII—Fascicle VIII.1; Oct. 8-19, 1984; p. 161 and diagram page.

*Primary Examiner*—Benedict V. Safourek
*Attorney, Agent, or Firm*—David P. Gordon

[57] ABSTRACT

Methods for embedding additional information (e.g. a password function) in a handshake of communicating modems is provided. An auxiliary packet containing the additional information is placed in the handshake sequence of an originating modem in such a manner that it cannot be confused by the receiving modem with other signals which are required to be sent by the originating modem in the modem handshake. The answering modem looks for the auxiliary packet, and if the auxiliary packet is not received, or if the information in the auxiliary packet is not sufficient to establish authorization, the answering modem causes the call to be dropped. In V.32 type modems, the auxiliary packet is placed by the originating modem somewhere in the training sequence (TRN) after the required twelve hundred eighty symbol intervals, and before the R2 sequence, and the auxiliary packet is generated in such a manner that it cannot be confused with the R2 sequence. In order to guarentee that the auxiliary packet is discernible and that no confusion with other signals is possible, the auxiliary packet is comprised of two multiplexed signals; an information signal at a 2400 bit/second rate which includes a burst flag, and an HDLC formatted start flag, password, check sum, and stop flag; and a 2400 bit/second R2 prevention signal which is coded to be compatible with the burst flag and to guarentee that regardless of the HDLC formatted signal, the composite auxiliary packet cannot constitute an R2 sequence.

43 Claims, 5 Drawing Sheets

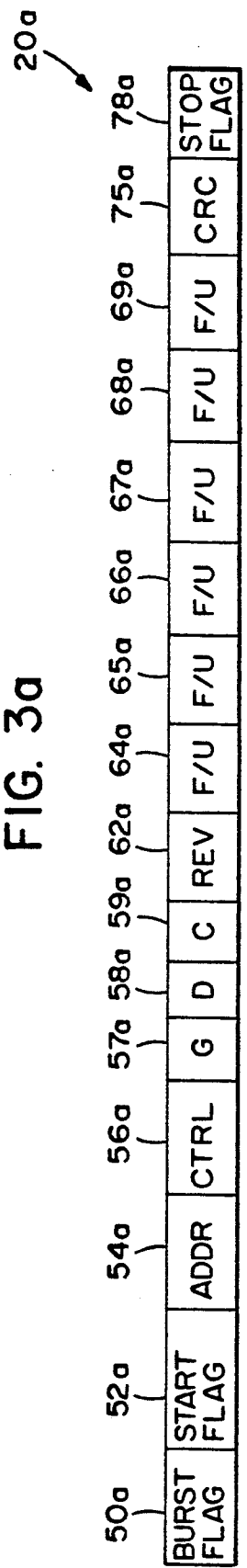
FIG. 3a
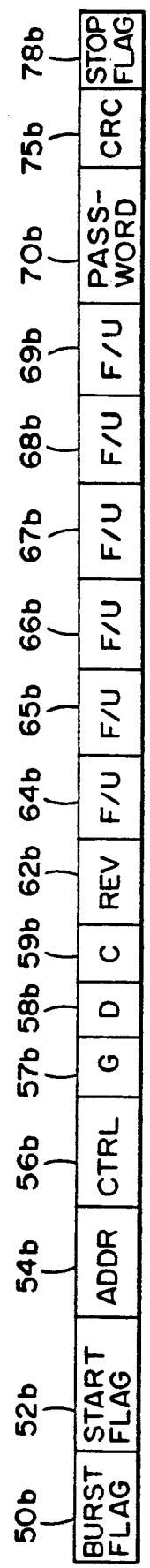
FIG. 3b
FIG. 3c
IOIOIOIOIOIOIOIOIO.....

METHOD FOR IMBEDDING INFORMATION IN MODEM HANDSHAKE PROCEDURE AND MODEMS INCORPORATING THE SAME

BACKGROUND OF THE INVENTION

This invention relates to a modems. More particularly, this invention relates to modems which utilize handshake procedures and which require information (e.g. a password) which is not normally transmitted in a handshake, before data communication is permitted to be established. The invention is used with modems utilizing a CCITT V.32 handshake procedure, although it it is not limited thereto.

Communications between modems are often governed by various standards, including standards or recommendations promulgated by the International Telegraph and Telephone Consultative Committee (CCITT). For example, a V.32 standard exists for full duplex modems which can transmit information at 9600 bits/second with a 4800 bits/second back-up. In the V.32 standard, start-up procedures (i.e. handshakes) are set forth in "Data Communication Over the Telephone Network—Recommendations of the V Series—Volume III—Fascile VIII.1", CCITT VIIIth Plenary Assembly, Malga-Torremolinos 9-19 October 1984, which is hereby incorporated by reference herein. The communication starts when an originating modem places a call and the answering modem detects a ring and goes off hook. As seen in FIG. 4/V.32 of the CCITT Recommendation which is reproduced as the prior art FIG. 1 hereof, the handshake continues when the answering modem sends an answer tone (ANS) of 2100 Hz for one or more seconds. The originating (or "calling") mode, upon receipt of the answer tone sends a 1800 Hz signal (AA), and the answering modem, upon receiving the AA signal responds with an AC signal (600 Hz and 3000 Hz tones), followed by a CA signal (continued tones reversed in phase) followed by another AC signal. Meanwhile, upon detecting the switch from AC to CA, the originating modem switches from signal AA to signal CC. In this manner each modem can measure the round trip delay experienced over the channel and can adjust its echo cancellers appropriately.

Once the round trip delay has been determined, the modems continue their handshake. The answering modem sends out a signal AB (S) for two hundred fifty-six symbol intervals, a signal CD (S̄) for sixteen symbol intervals, a training sequence (TRN) for between 1280 and 8192 symbol intervals, and a repeated sixteen bit rate sequence R1. The training sequence includes a pseudo-random sequence with scrambled ones at 4800 bits/second with dibits encoded directly to states A, B, C, and D according to a predetermined format. The function of the S, S̄, and TRN sequence being sent by the answering modem is to train the adaptive equalizer in the calling modem as well as to train the echo canceller to the answering modem. The sixteen bit rate sequence R1, on the other hand is a 4800 bits/second scrambled and differentially encoded sequence as set forth in Table 1/V.32 which is used to indicate to the calling model which of several modes the answering modem can support.

Upon receiving the S, S̄, TRN, and R1 sequence, the originating modem essentially repeats the same sequence, except that instead of supplying the R1 signal after the training sequence, the calling modem provides an R2 signal. The R2 signal indicates the common modes between the originating and answering modem, and provisionally chooses a mode. While the R2 signal continues, the answering modem again repeats the S, S̄, TRN, sequence, followed by R3 which finally chooses the mode of communication (e.g. 9600, 9600 Trellis encoded, 4800, 2400). The handshake terminates with respective transmissions by the originating and answering modem of an E signal which confirms the mode of communication, and a B1 signal which is comprised of scrambled marks at the agreed upon rate. The handshake terminates and desired data transmission starts immediately after the B1 signal.

As will be appreciated by a review of FIG. 1 and by reference to the CCITT recommendation which has been incorporated by reference herein, the V.32 handshake does not provide for passwords or the like which would provide built in security against unauthorized dial up access or against network tampering. In fact, with the provided V.32 handshake, the answering modem will communicate with any calling modem which has the proper V.32 handshake. Those skilled in the art will also appreciate that the handshakes set out by other standards similarly do not include passwords or other security against unauthorized dial up access. The handshakes of the art also do not typically envision the passing of any additional information during the handshake sequence.

SUMMARY OF THE INVENTION

It is therefore an object of the invention to provide a method for building a password function into a handshake sequence of communicating modems, and a modem system utilizing the same.

It is another object of the invention to provide a method for providing a password function which is compatible with the V.32 handshake of communicating modems into that V.32 handshake.

It is a further object of the invention to provide a security arrangement for a V.32 modem which will virtually guarantee protection of an answering modem against communication with unauthorized modems.

It is yet another object of the invention to provide a method for building information fields into a handshake sequence of communicating modems.

It is even a further object of the invention to provide a method for providing information fields into a handshake sequence of communicating modems, wherein an answering modem is arranged to determine which information fields are active.

In accord with the objects of the invention, the method invention for embedding additional information (e.g. a password function) in a handshake of communicating modems may take several different embodiments. In all of the embodiments, an auxiliary packet containing the additional information is placed in the handshake sequence of an originating modem in such a manner that it cannot be confused by the receiving modem with other signals which are required to be sent by the originating modem in the modem handshake. The location in the handshake and the content of the auxiliary packet might vary depending upon the circumstances. Regardless, the answering modem looks for the auxiliary packet, and if the auxiliary packet is not received, or if the information in the auxiliary packet is not sufficient to establish authorization, the answering modem causes the call to be dropped.

According to the preferred embodiment, where the communicating modems are V.32 type modems, the auxiliary packet is placed by the originating modem somewhere in the training sequence (TRN) after the required twelve hundred eighty symbol intervals, and before the R2 sequence, and the auxiliary packet is generated in such a manner such that it cannot be confused with the R2 sequence. In order to guarantee that the auxiliary packet is discernible and that no confusion with other signals is possible, the auxiliary packet is comprised of two multiplexed signals; an information signal at a 2400 bit/second rate which includes a burst flag, and an HDLC (High-level Data Link Control procedure specified by the ISO) formatted start flag, password, check sum, and stop flag; and a 2400 bit/second R2 prevention signal which is coded to be compatible with the burst flag and to guarantee that regardless of the HDLC formatted signal, the composite auxiliary packet cannot constitute an R2 sequence. The password is preferably a ten ASCII character password, which guarantees absolute protection as over seventy thousand quadrillion ($128^{10}$) combinations are available. The answering modem, upon receiving the burst flag, synchronizes with the burst flag, demultiplexes the HDLC formatted signal from the R2 prevention signal, decodes the HDLC signal, and checks the password for validity.

Also, in the preferred embodiment, an auxiliary packet is transmitted by the answering modem between the TRN and R1 signals. The auxiliary packet transmitted by the answering modem is identical in format to that of the originating mode, except that a password is not included therein.

According to another aspect of the invention the information signal of the auxiliary packet further includes a plurality of information fields which are included in the HDLC formatted signal, and which allow transfer of information such as call-back numbers, or transfer of instructions such as an instruction for the initiation of a remote optioning session. Further, by providing a revision field in the information signal of the auxiliary packet, the answering modem can determine the meaning of the information fields in the originating modem's information signal even if originating modems having different meanings for the same information field.

The preferred modem invention closely corresponds to the method invention and includes an auxiliary packet generating means for generating in the modem handshake an auxiliary packet which contains a password and which cannot be confused with other handshake signals of the modem, and an auxiliary packet decoding means including a searching means for finding an auxiliary packet, means for locating the password in the auxiliary packet, and means for causing the communication channel to be dropped if the password is not valid for the answering modem. In a full duplex modem, both originating and answering functions are required. Thus, a full duplex modem includes both an auxiliary packet generating means and an auxiliary packet decoding means.

Further objects and advantages of the invention will become evident to those skilled in the art upon reference to the detailed description taken in conjunction with the provided figures.

BRIEF DESCRIPTION OF THE DRAWINGS

FIGS. 3a and 3b are diagrams showing the preferred information signals of the auxiliary packets of the answering and originating modems respectively;

FIG. 3c is a diagram showing the preferred R2 prevention signal of the auxiliary packet of the invention;

DETAILED DESCRIPTION OF THE PREFERRED EMBODIMENTS

Figure 1:
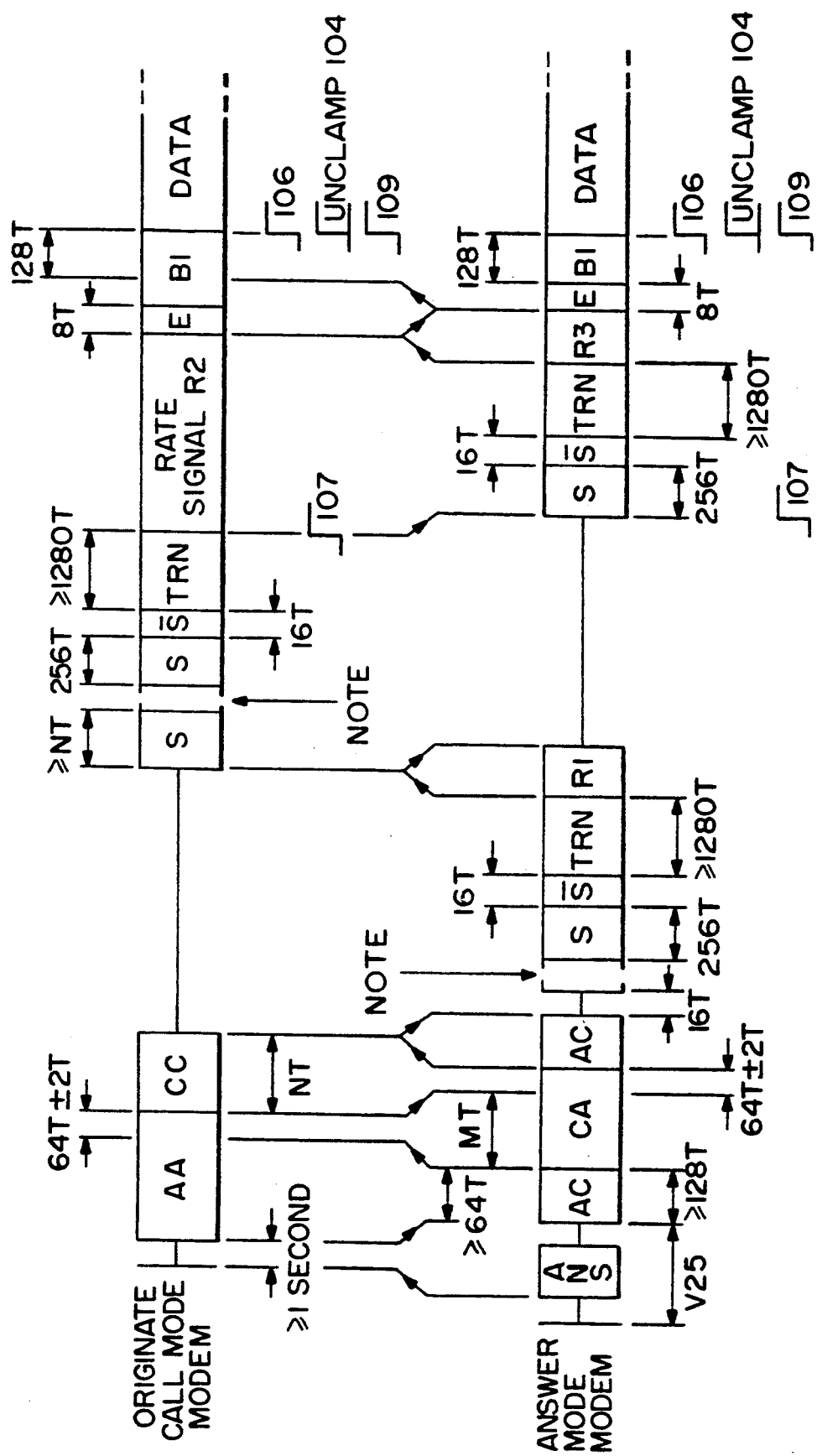
FIG. 1 is a prior art handshake diagram of V.32 compatible modems.
Figure 2:
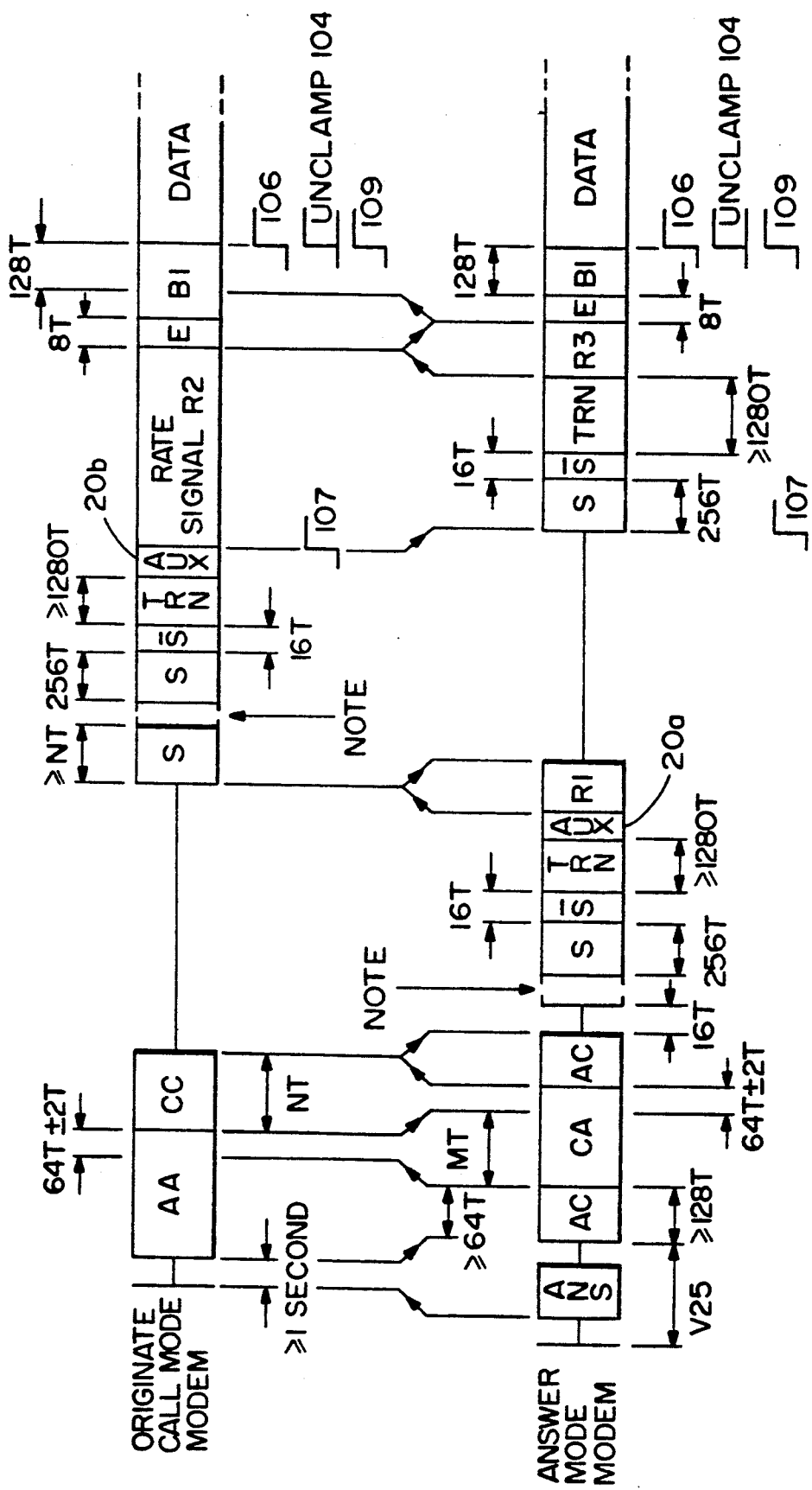
FIG. 2 is a handshake diagram showing a preferred V.32 handshake incorporating a security procedure in accord with the method invention.

Turning to FIG. 2, a revised V.32 handshake incorporating auxiliary packets in accord with the preferred embodiment of the invention is seen. The only, but critical difference, between the revised V.32 handshake of FIG. 2 and the standard prior art V.32 handshake of FIG. 1 is the inclusion of an auxiliary packet 20a between the TRN and R1 signals of the answering modem, and the inclusion of an auxiliary packet 20b between the TRN and R2 signals of the originating modem. The bounds of the location of the auxiliary packets is somewhere after 1280 symbol intervals of the training sequence (the minimum training sequence required) and somewhere before 8192 symbol intervals of the training sequence (at which time the training sequence must end). According to the preferred embodiment, because the auxiliary packet of the originating modem takes approximately 230-270 symbol intervals to send (the exact number being data dependent), the auxiliary packet of the originating modem should start at or before the 7922nd symbol interval of the training sequence. As described below, the auxiliary packet of the answering modem is shorter. Thus, the auxiliary packet can start slightly later.

Auxiliary packets 20a and 20b are preferably comprised of a 2400 bits/sec information signal (seen in FIGS. 3a and 3b) multiplexed with a 2400 bits/sec "R prevention" signal. The R prevention signal (an example of which is shown in FIG. 3c) is comprised of a repeating 1010 pattern. With such a pattern, when the prevention signal is bit multiplexed with the information signal, it is impossible for any four consecutive bits of the auxiliary packet to be of value zero. Since the R signals require four consecutive zeros at the start of the R signal, the provided auxiliary packet cannot be inadvertently confused with the R signal. Similarly, with the repeating 1010 R prevention pattern, the auxiliary packet cannot have four consecutive bits of value one. Hence, the auxiliary packet cannot be inadvertently confused with the E signal which requires for ones at is inception. The "R prevention" signal is therefore also an E prevention signal, or more broadly, a signal which prevents the auxiliary packet from appearing as an otherwise expected handshake signal.

The forms that auxiliary packets 20a and 20b preferably take are seen in FIGS. 3a and 3b. The answering modem's auxiliary packet 20a is comprised of a burst flag 50a, a start flag 52a, an address field 54a, a control field 56a, three identification fields 57a, 58a, and 59a, a revision field 62a, six information fields 64a, 65a, 66a, 67a, 68a, and 69a, a check sum 75a comprised of one or more fields, and a stop flag 78a. The originating modem's auxiliary packet 20b is similarly comprised, except that it includes a password 70b. Thus, the auxiliary packet 20b has a burst flag 50b, a start flag 52b, an address field 54b, a control field 56b, three identification fields 57b, 58b, and 59b, a revision field 62b, six information fields 64b, 65b, 66b, 67b, 68b, and 69b, a password 70b comprised of a plurality of fields, a check sum 75b comprised of one or more fields, and a stop flag 78b.

The burst flags 50 of the information signals of both the answering and originating modems are preferably identical and are comprised of a repeating 1010 . . . pattern. The start flags 52 and stop flags 78 are preferably of the hexadecimal value 7E (binary 01111110). The address field 54 is provided for purposes of a network system. Each node may be have a specified address. Or, if desired, a global address may be utilized such that all nodes will receive the information. The control field 56 indicates whether the remaining information in the information signal is control or data information. The next three fields 57-59 are fixed verification (identification) fields where ASCII characters may be inserted to identify the source of the modem. The revision field 62 (e.g. eight bits in length) uses four bits to provide one communicating modem with information regarding the "vintage" of the other communicating modem; i.e. the revision field provides a code which identifies the meaning of the information fields 64-69 of the other modem. Those four bits of the revision field 62 is particularly important for an answering modem if different originating modems have different meanings for the same information field, such as might arise due to revisions in hardware or software capabilities. In accord with the preferred embodiment of the invention, the remaining four bits of the revision field are used as follows. One bit is used to indicate whether the modem is training up for the first time (i.e. first use of the modem). A second bit is used to indicate that that the modem has trained before. A third bit is used to indicate whether the modem is auto dial backup mode, and the fourth bit is used to initiate a call back, as hereinafter described.

After the revision field, several information fields are provided as seen in FIGS. 3a and 3b. In the preferred embodiment, the first information field contains the cell number to be dialed by the answering modem if the cell back bit in the revision field is set as above-described. The remaining information fields are utilized as desired. For example, another information field can be utilized to signal that a remote optioning session is to be conducted rather than the sending of data. If such a signal were to be transmitted, after the B1 signal, the modems would not send data. Rather, a link would be established between AT type parsers such that AT type commands could be executed on one modem to set options on the other.

As indicated in FIG. 3b, the originating modem must then send a password 70b, which in the preferred embodiment is comprised of ten ASCII characters. Because each character may be any of one hundred twenty-eight values, the ten ASCII character password provides over seventy thousand quadrillion ($128^{10}$) combinations; and because each telephone call between handshaking modems requires seventeen seconds to complete, security against continued calls with a systematic attempt to cover all possible codes will be absolute.

After the password 70b in the case of the originating modem, and after the information fields of the answering modem, the checksum field CRC 75 is provided to guarantee the accuracy of the other parts of the information signal. In accord with the preferred embodiment of the invention, the checksum is sixteen bits long. The checksum 75 is then followed by the stop flag 78 which has the hexadecimal value 7E.

In order to prevent the situation where the information contained in the information signal accidentally includes a 7E (hex) value before the stop flag which would inadvertently eliminate desired fields of the information signal, the information signal (excluding the burst flag) is preferably packetized into an HDLC format. The HDLC algorithm utilizes hex value 7E as the start and stop flags and codes the remaining information by inserting zeros to eliminate the possibility of a six ones (i.e. Hex 7E=01111110) appearing consecutively.

Figure 4A:
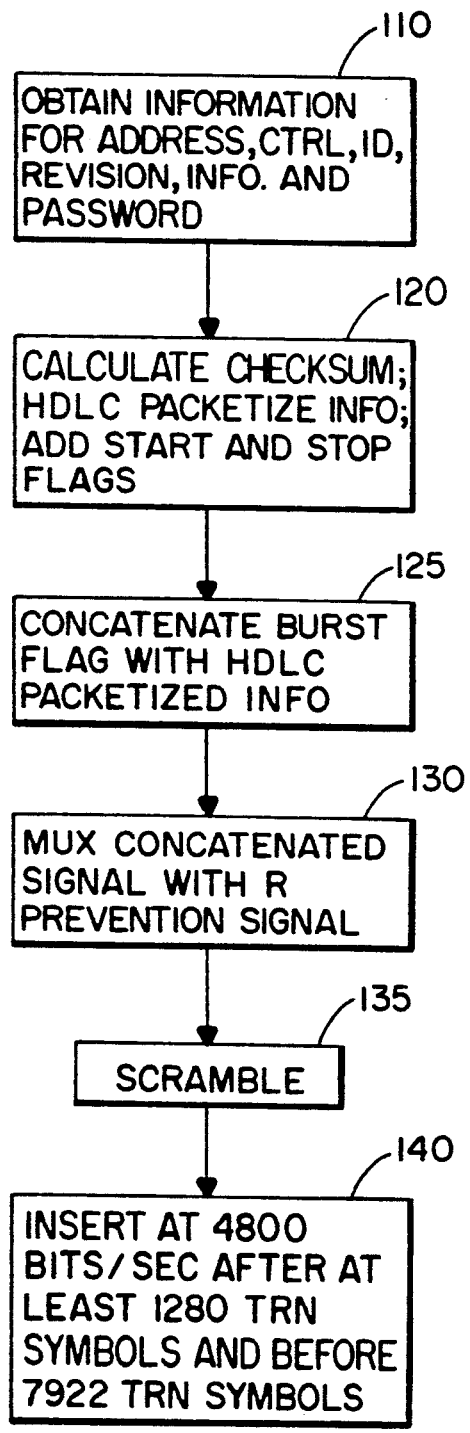
FIGS. 4a and 4b are high level flow charts of the auxiliary packet generating means and the auxiliary packet detecting means of the originating and answering modems of the system invention.
Figure 4B:
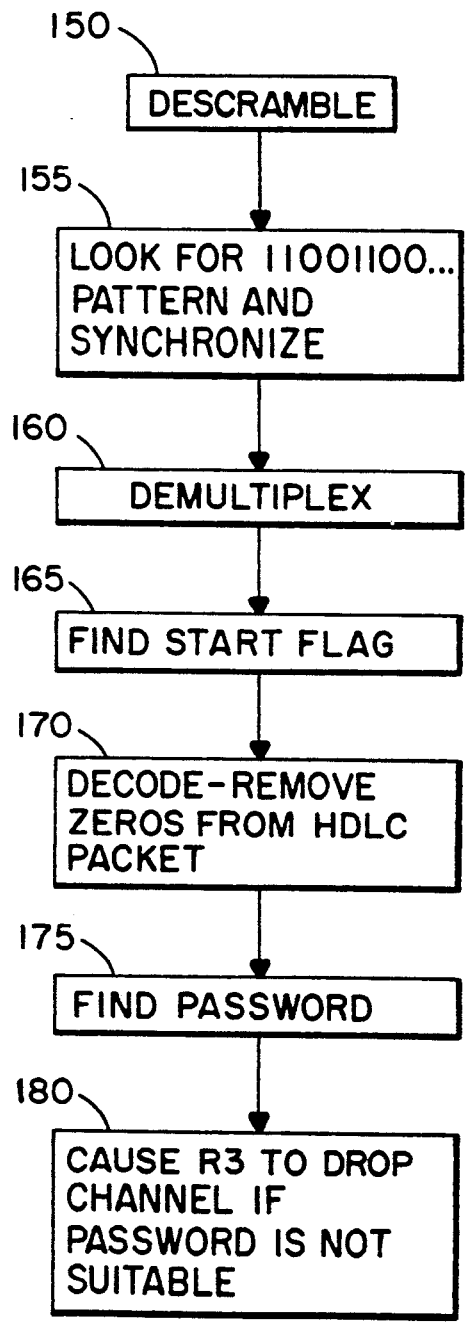
Figure 5:
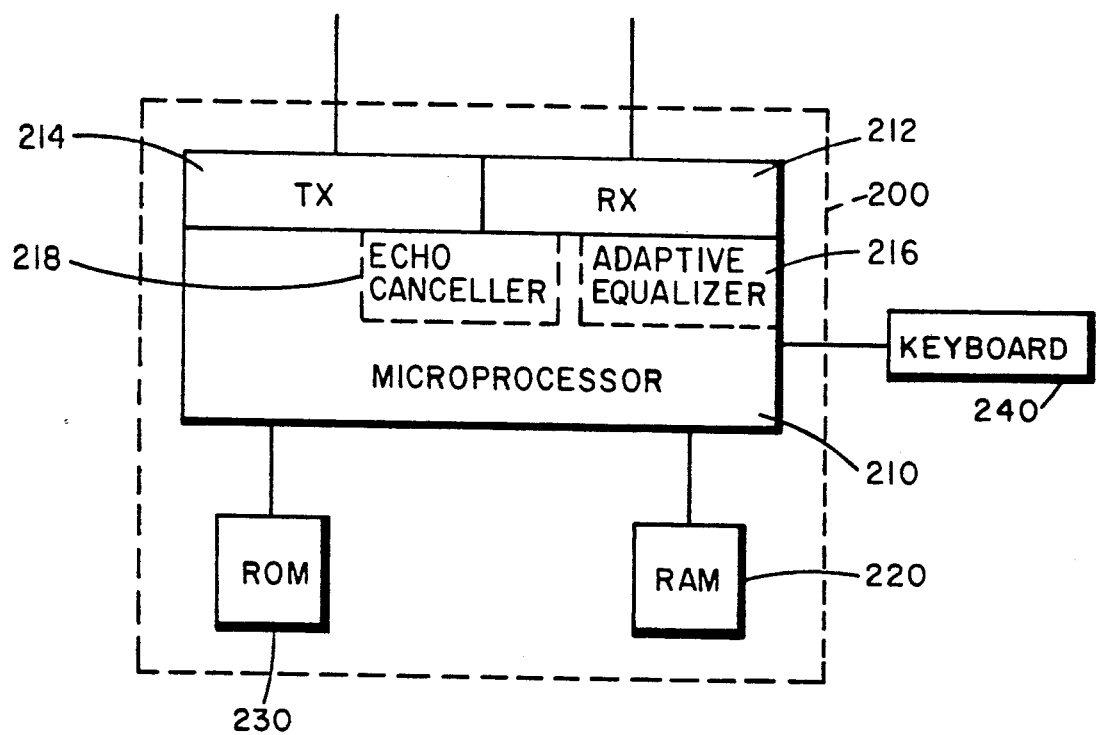
FIG. 5 is a high level block diagram of a modem in which invention is implemented.

A high level flow chart of an auxiliary packet generating means and an auxiliary packet detection means of a preferred modem 200 is seen in FIGS. 4a and 4b. Both the auxiliary packet generating means and auxiliary packet detection means are implemented in a microprocessor 210 seen in FIG. 5 (e.g. an Intel 8097) with an accompanying memory such as a RAM 220 or ROM 230 and having a receive function 212, transmit function 214, and preferably an adaptive equalizer function 216 and an echo cancelling function 218. As indicated in FIG. 4a, in order to generate an auxiliary packet, the microprocessor of the modem obtains at 110 information for the address, control, ID, revision, and information fields (54, 56, 57-59, 62, and 64-69, of FIGS. 3), and if the modem is an originating modem, the password field 70. The information is "obtained" either via keyboard input from a user, from associated memory, or through processing of the information obtained. The password 70 is typically obtained via keyboard input of a user, while the ID fields 57-59 and revision field 62 are typically obtained from memory. After the information is obtained, the microprocessor calculates a checksum for all of the inserted information, the information and checksum are encoded according to the HDLC format (zero insertion), and stop and start flags (7E Hex) are added at 120. At 125, a burst flag, preferably of the form 10101010 . . . is added to the beginning of the packet (i.e. concatentated), and the concatenated signal is then multiplexed with the R prevention signal 101010 . . . of FIG. 3c at 130 to create a 4800 bits/sec auxiliary packet. The auxiliary packet is scrambled at 135 and inserted into the V.32 handshake at 140 after at least 1280 TRN symbols and before 7922 TRN symbols.

The flow diagram of a microprocessor which acts as an auxiliary packet detection means is seen in FIG. 4b. When a modem is in a V.32 handshake procedure, the modem descrables the received information at 150, and after receiving 1280 TRN symbols, the modem looks at 155 for a pattern 11001100 . . . and upon receiving that pattern synchronizes on that pattern. The pattern 11001100 . . . is the pattern created when the burst flag 10101010 . . . of the information signal is multiplexes with the R prevention signal 101010 . . . Upon synchronizing, the modem demultiplexes at 160 the auxiliary packet and finds the start flag 7E (hex) at 165. The remaining signal is decoded from HDLC format (i.e. zeros are removed) at 170, and then the information contained in the auxiliary packet is used as desired. For example, and as indicated in FIG. 4b, the information signal of the auxiliary packet contains a password. Thus, the auxiliary packet detection means finds the password at 175. If the password is valid, as determined by a comparison of the password with a library of valid or invalid passwords stored in memory, communication is permitted to continue. However, if the password is not valid, the modem should provide an R signal at 180 which causes the channel to be dropped due to incompatibility of the communicating modems.

There has been described and illustrated herein a method for imbedding information in a modem handshake procedure. While particular embodiments were discussed, it should be appreciated by those skilled in the art that it is intended that the invention be broad in scope and that the specifications be read likewise. Thus, while it is preferred that the answering modem insert an auxiliary packet between TRN and R1, and that the originating modem insert an auxiliary packet between TRN and R2, it will be appreciated that only one of the modems need send such an auxiliary packet; that modem being the originating modem if a password is required for communication. On the other hand, an additional auxiliary packet may be inserted, if desired, between TRN and R3. Also, while it is preferred that the auxiliary packet contain address, control, ID, revision, and information fields as well as a password for the originating modem, it will be appreciated that the invention applies to a situation where only an information field or only the password field is sent. Further, while the information signal is preferably encoded according to the HDLC format, such an encoding is only desirable and not mandatory. Other coding could be used, or the signal need not be encoded at all. Indeed, all that is necessary to send a password (or other information) where the password (or other information) can start between 1280 and 7922 TRN symbols is a burst flag followed by a start flag followed by the password (or the other information). In fact, if certain requirements are placed on the password, the password could incorporate the start flag and even part or all of the burst flag. Also, the start flag and the burst flag may be eliminated by fixing the location of the auxiliary packets (e.g. after exactly 5000 or 7000 TRN symbols).

It will further be appreciated by those skilled in the art that the invention has application beyond V.32 type modems. In particular, where it is desired to add an auxiliary packet to a handshake sequence, all that is required is 1) that the auxiliary packet be added either as part of variable length signal, or in a time location where a signal may be sent although the handshake does not require a signal at that time; and 2) that the auxiliary packet take a form other than the format of signals which comprise the standard handshake.

In order to guarantee that the auxiliary packet takes a form other than the format of signals which comprise the standard handshake, it may be necessary to multiplex the information signal (which typically contains the password) with a "prevention" signal, although it may also be possible to build the prevention signal directly into the information signal by placing severe restrictions on the information signal. It should be appreciated, that if a prevention signal is used, it need not be at the same rate as the information signal; i.e. multiplexing between the prevention and information signals need not be at a 1:1 ratio.

Finally, it will be appreciated that other details of the disclosed invention can be changed. For example, the password need to be ten characters long, as fewer characters could still provide complete security. Further, the answering modem can be provided with a switch which would activate or deactive the need for an originating modem to provide an auxiliary packet in order to establish communications. Therefore, it will be apparent to those skilled in the art that additional modifications can be made to the described invention without deviating from the scope and spirit of the invention as so claimed.

I claim:

1. A method for embedding information in a handshake procedure of a communicating originating and an answering modem, comprising:
    a) in an originating modem, generating an auxiliary packet containing the information to be embedded in the handshake procedure such that the auxiliary packet is in a form other than the formats of the handshake signals which are required by the handshake procedure to be sent from the originating modem to the answering modem and cannot be interpreted by the answering modem as one of the handshake signals; and
    b) placing said generated auxiliary packet among the handshake signals required to be sent from said originating modem to said answering modem after said answering modem has been trained on originating modem handshake signals and before said answering modem and said originating modem have agreed to communicate data wherein
    said auxiliary packet is generated by multiplexing an information signal containing said information and a prevention signal which prevents the auxiliary packet generated by the multiplexing from being interpreted by the answering modem as one of the handshake signals.

2. A method according to claim 1, further comprising:
    c) in said answering modem, attempting to find said auxiliary packet and causing communications between said originating and answering modems to be dropped if said auxiliary packet is not found.

3. A method according to claim 2, wherein said information contained in said auxiliary packet includes a password, said method further comprising:
    d) storing either an authorized or non-authorized password code in said answering modem;
    e) in said answering modem, finding said password in said auxiliary packet, comparing said password to the stored password code, and causing communications between said originating and answering modems to be continued or dropped accordingly.

4. A method according to claim 3, wherein:
    said auxiliary packet is generated by multiplexing an information signal containing said information, and a prevention signal which prevents the auxiliary packet generated by the multiplexing from being interpreted by the answering modem as one of the handshake signals, said information signal including said password.

5. A method according to claim 4, wherein:
    said information signal further comprises a burst flag, a start flag, and a stop flag.

6. A method according to claim 5, wherein:
    said information signal further comprises an information field.

7. A method according to claim 1, wherein:
said information signal comprises an information field.

8. A method according to claim 7, wherein:
said information signal further comprises a burst flag, a start flag, and a stop flag.

9. A method according to claim 7, wherein:
said information signal further comprises a revision field for helping said answering modem to determine the meaning of said information field.

10. A method according to claim 1, wherein:
said originating and answering modems are V.32 type modems;
said originating modem sends a training (TRN) sequence having at least 1280 symbols, followed by a rate signal (R2); and
said auxiliary packet is placed in said handshake procedure after the at least 1280 symbols of the TRN sequence, and before the R2 signal.

11. A method according to claim 1, wherein:
said originating and answering modems are V.32 type modems;
said originating modem sends a training (TRN) sequence having at least 1280 symbols, followed by a rate signal (R2);
said auxiliary packet is placed in said handshake procedure after the at least 1280 symbols of the TRN sequence, and before the R2 signal; and
said prevention signal prevents said auxiliary packet from appearing as an R2 signal.

12. A method according to claim 11, wherein:
said prevention signal is a 2400 bits/sec signal of the form 1010 . . . , said information signal is a 2400 bits/sec signal, and said auxiliary packet generated from multiplexing said prevention signal and said information signal is a 4800 bits/sec signal.

13. A method according to claim 12, wherein:
said information signal comprises a burst flag, a start flag, and a password,
said password being coded according to an HDLC format, and said start flag being provided according to the SLDC format.

14. A method according to claim 12, wherein:
said information signal comprises a burst flag, a start flag, and an information field,
said information field being coded according to an HDLC format, and said start flag being provided according to the HDLC format.

15. A method according to claim 4, wherein:
said originating and answering modems are V.32 type modems;
said originating modem sends a training (TRN) sequence having at least 1280 symbols, followed by a rate signal (R2);
said auxiliary packet is placed in said handshake procedure after the at least 1280 symbols of the TRN sequence, and before the R2 signal; and
said prevention signal prevents said auxiliary packet from appearing as an R2 signal.

16. A method according to claim 15, wherein:
said information signal comprises a burst flag, a start flag, and said password,
said password being coded according to an HDLC format, and said start flag being provided according to the SLDC format,
said burst flag being in the form of 1010 . . . ,
wherein said step of attempting to find said auxiliary packet comprises searching for a 11001100 . . . pattern.

17. A method according to claim 16, wherein:
said information signal further comprises an information field and a checksum coded according to an HDLC format.

18. In a modem having means for generating and sending data signals suitable for transmission over a telecommunications channel, as well as handshake protocol signals required in a handshake procedure, the improvement comprising:
a) means, in said means for generating and sending, for generating an auxiliary packet containing an information signal, said auxiliary packet being generated in a form other than the formats of the handshake protocol signals which are required by the handshake procedure to be sent from said modem to an answering modem such that the auxiliary packet cannot be interpreted by the answering modem as one of the handshake signals; and
b) means, in said means for generating and sending, for sending said generated auxiliary packet among the handshake signals required to be sent from said modem to the answering modem after the answering modem has been trained on said handshake protocol signals of said modem and before the answering modem and said modem have agreed to communicate data wherein
said means for generating an auxiliary packet comprises means for generating said information signal and for generating a prevention signal, and means for multiplexing said information signal with said prevention signal, said prevention signal preventing the auxiliary packet generated by said means for multiplexing from being interpreted as a said handshake protocol signal.

19. The improvement in the modem of claim 18, wherein:
said means for generating an information signal includes means for generating a burst flag, a start flag, a password, and a stop flag.

20. The improvement in the modem of claim 19, wherein:
said means for generating an information signal further includes means for coding said password according to the HDLC format.

21. The improvement in the modem of claim 18, wherein:
said means for generating an information signal includes means for generating a burst flag, a start flag, an information field, and a stop flag.

22. The improvement in the modem of claim 21, wherein:
said means for generating an information signal further includes means for coding said information field according to the HDLC format.

23. In the modem of claim 18 which further includes means for receiving and processing said data signals and said handshake protocol signals, the improvement further comprising:
c) means, in said receiving and processing means, for attempting to find an auxiliary packet sent by an originating modem, and for generating a signal causing communications between said modem and said originating modem to be dropped if said auxiliary packet is not found.

24. In the modem of claim 23, the improvement further comprising:
  d) memory means for storing either an authorized or non-authorized password code; and
  e) means, in said receiving and processing means, for finding said password in said auxiliary packet, comparing said password to the stored password code, and for generating a signal causing communications between said modem and said originating modem to be continued or dropped accordingly.

25. The improvement in the modem of claim 24, wherein:
  said means for finding said password comprises, means for locating and synchronizing with said auxiliary packet, means for demultiplexing said information signal and said prevention signal, and means for locating said password within said information signal.

26. A method for embedding information in a handshake procedure of a communicating originating and an answering modem, said answering modem including an adaptive equalizer which is trained, said method comprising:
  a) in an originating modem, generating an auxiliary packet containing the information to be embedded in the handshake procedure such that the auxiliary packet is in a form other than the formats of the handshake signals which are required by the handshake procedure to be sent from the originating modem to the answering modem and cannot be interpreted by the answering modem as one of the handshake signals; and
  b) placing said generated auxiliary packet among the handshake signals required to be sent from said originating modem to said answering modem after said adaptive equalizer of said answering modem has been trained on originating modem handshake signals and before said answering modem and said originating modem have agreed to communicate data.

27. A method according to claim 26, further comprising:
  c) in said answering modem, attempting to find said auxiliary packet and causing communications between said originating and answering modems to be dropped if said auxiliary packet is not found.

28. A method according to claim 27, wherein said information contained in said auxiliary packet includes a password, said method further comprising:
  d) storing either an authorized or non-authorized password code in said answering modem;
  e) in said answering modem, finding said password in said auxiliary packet, comparing said password to the stored password code, and causing communications between said originating and answering modems to be continued or dropped accordingly.

29. A method according to claim 26, wherein:
said auxiliary packet is generated by multiplexing an information signal containing said information and a prevention signal which prevents the auxiliary packet generated by the multiplexing from being interpreted by the answering modem as one of the handshake signals.

30. A method according to claim 28, wherein:
said auxiliary packet is generated by multiplexing an information signal containing said information, and a prevention signal which prevents the auxiliary packet generated by the multiplexing from being interpreted by the answering modem as one of the handshake signals, said information signal including said password.

31. A method according to claim 30, wherein:
said information signal further comprises a burst flag, a start flag, and a stop flag.

32. A method according to claim 31, wherein:
said information signal further comprises an information field.

33. A method according to claim 29, wherein:
said information signal comprises an information field.

34. A method according to claim 33, wherein:
said information signal further comprises a burst flag, a start flag, and a stop flag.

35. A method according to claim 33, wherein:
said information signal further comprises a revision field for helping said answering modem to determine the meaning of said information field.

36. A method according to claim 26, wherein:
said originating and answering modems are V.32 type modems;
said originating modem sends a training (TRN) sequence having at least 1280 symbols, followed by a rate signal (R2); and
said auxiliary packet is placed in said handshake procedure after the at least 1280 symbols of the TRN sequence, and before the R2 signal.

37. A method according to claim 29, wherein:
said originating and answering modems are V.32 type modems;
said originating modem sends a training (TRN) sequence having at least 1280 symbols, followed by a rate signal (R2);
said auxiliary packet is placed in said handshake procedure after the at least 1280 symbols of the TRN sequence, and before the R2 signal; and
said prevention signal prevents said auxiliary packet from appearing as an R2 signal.

38. A method according to claim 37, wherein:
said prevention signal is a 2400 bits/sec signal of the form 1010 . . . , said information signal is a 2400 bits/sec signal, and said auxiliary packet generated from multiplexing said prevention signal and said information signal is a 4800 bits/sec signal.

39. A method according to claim 38, wherein:
said information signal comprises a burst flag, a start flag, and a password,
said password being coded according to an HDLC format, and said start flag being provided according to the SLDC format.

40. A method according to claim 38, wherein:
said information signal comprises a burst flag, a start flag, and an information field,
said information field being coded according to an HDLC format, and said start flag being provided according to the HDLC format.

41. A method according to claim 30, wherein:
said originating and answering modems are V.32 type modems;
said originating modem sends a training (TRN) sequence having at least 1280 symbols, followed by a rate signal (R2);
said auxiliary packet is placed in said handshake procedure after the at least 1280 symbols of the TRN sequence, and before the R2 signal; and
said prevention signal prevents said auxiliary packet from appearing as an R2 signal.

42. A method according to claim 41, wherein:
said information signal comprises a burst flag, a start flag, and said password,
said password being coded according to an HDLC format, and said start flag being provided according to the SLDC format,
said burst flag being in the form of 1010 . . . ,
wherein said step of attempting to find said auxiliary packet comprises searching for a 11001100 . . . pattern.

43. A method according to claim 42, wherein:
said information signal further comprises an information field and checksum coded according to an HDLC format.

* * * * *